US006524638B2

(12) United States Patent
Knipper et al.

(10) Patent No.: US 6,524,638 B2
(45) Date of Patent: Feb. 25, 2003

(54) ENHANCED PRECOOKED EGG PRODUCT AND PROCESS FOR FORMULATION OF PRECOOKED EGG PRODUCTS

(75) Inventors: Aloysius J. Knipper, Ringwood, NJ (US); Lauren S. Beam, New York, NY (US)

(73) Assignee: Michael Foods, Inc., Minnetonka, MN (US)

( * ) Notice: Subject to any disclaimer, the term of this patent is extended or adjusted under 35 U.S.C. 154(b) by 0 days.

(21) Appl. No.: 10/063,552

(22) Filed: May 2, 2002

(65) Prior Publication Data

US 2002/0114875 A1 Aug. 22, 2002

Related U.S. Application Data

(62) Division of application No. 09/644,103, filed on Aug. 23, 2000, now Pat. No. 6,413,572.
(60) Provisional application No. 60/150,427, filed on Aug. 24, 1999.

(51) Int. Cl.$^7$ .................................................. A23L 1/32
(52) U.S. Cl. ........................ 426/614; 426/512; 426/515; 426/561
(58) Field of Search ................................ 426/614, 512, 426/515, 561

(56) References Cited

U.S. PATENT DOCUMENTS

| 3,043,700 A | 7/1962 | Szczesniak | 99/92 |
|---|---|---|---|
| 3,459,560 A | 8/1969 | Shea | 99/92 |
| 3,640,732 A | 2/1972 | Johnson | 99/114 |
| 3,655,405 A | 4/1972 | Karas et al. | 99/94 |
| 3,697,290 A | 10/1972 | Lynn | 99/86 |
| 3,864,500 A | 2/1975 | Lynn | 426/195 |
| 3,982,040 A | 9/1976 | Oborn | 426/614 |
| 3,987,212 A | 10/1976 | Seeley et al. | 426/614 |
| 4,000,323 A | 12/1976 | Youngquist | 426/93 |
| 4,068,013 A | 1/1978 | Brule | 426/565 |
| 4,200,663 A | 4/1980 | Seeley et al. | 426/614 |
| 4,428,971 A | 1/1984 | Havette et al. | 426/565 |
| 4,746,521 A | 5/1988 | Niwano et al. | 426/241 |
| 5,246,717 A | 9/1993 | Garwin | 426/2 |
| 5,283,072 A | 2/1994 | Cox et al. | 426/312 |
| 5,589,211 A | 12/1996 | Cox et al. | 426/298 |
| 5,620,735 A | 4/1997 | Manderfeld et al. | 426/614 |
| 5,665,416 A | 9/1997 | Manderfeld et al. | 426/614 |
| 6,413,572 B1 * | 7/2002 | Knipper et al. | |

FOREIGN PATENT DOCUMENTS

EP 0545025 B1 6/1993

OTHER PUBLICATIONS

Abstract JP59017950A2.
Abstract JP1144936A2.
Abstract JP 1179668A2.

* cited by examiner

Primary Examiner—Anthony J. Weier
(74) Attorney, Agent, or Firm—Vidas, Arrett & Steinkraus, P.A.

(57) ABSTRACT

The present process relates to forming of precooked egg patties for future heating within a microwave oven for consumption as a portion of a food article. The process involves the initial step of acquisition of liquid whole eggs, liquid egg whites and/or liquid egg yolks mixed with leavening ingredients (a mix of an acid and a base) to create an egg patty with improved texture and appearance for use within a breakfast sandwich following initial cooking. The following ingredients may be added to further improve the product: non-fat dry milk, modified food starch, gums, and emulsifiers. The process in summary involves adding to liquid eggs leavening ingredients or agents and then cooking of the mixed eggs and leavening ingredients prior to the dissipation of the leavening ingredients to form an egg patty having improved appearance and a light and airy texture.

17 Claims, No Drawings

ENHANCED PRECOOKED EGG PRODUCT AND PROCESS FOR FORMULATION OF PRECOOKED EGG PRODUCTS

CROSS REFERENCE TO RELATED APPLICATIONS

The present patent application for ENHANCED PRECOOKED EGG PRODUCT AND PROCESS FOR FORMULATION OF PRECOOKED EGG PRODUCTS is based upon and claims priority to provisional patent application Serial No. 60/150,427 as filed on Aug. 24, 1999 entitled PROCESS FOR FORMULATION OF PRECOOKED EGG PRODUCTS, and U.S. patent application Ser. No. 09/644,103 is a divisional filed Aug. 23, 2000 for ENHANCED PRECOOKED EGG PRODUCT AND PROCESS FOR FORMULATION OF PRECOOKED EGG PROODUCTS now U.S. Pat. No. 6,413,572 both of which are incorporated herein by reference in their entireties.

BACKGROUND OF INVENTION

The present invention is directed to an enhanced precooked egg product and a process for forming precooked egg products namely egg patties for future heating within a microwave, convection oven or griddle for consumption as a portion of a food article. The precooked egg patties are primarily used as an ingredient within a food product such as a breakfast sandwich to be heated and consumed by an individual.

In the past, egg patties for use in consumable food articles have been formed by the filling of a mold with a liquid egg mixture and cooking the liquid egg within the mold. Alternatively, a liquid egg mixture may be pumped onto a flat cooking belt for cooking within an oven. Egg patties produced according to the above identified methods unfortunately have the appearance of commercial processing. These egg patties generally are extremely dense and have the appearance of a cheese product. Egg patties formed through the use of a mold and/or cooking through use of a flat cooking belt frequently were difficult to distinguish from the cheese portion of a breakfast sandwich. A need therefor exists to eliminate the dense commercial processing appearance for egg patties formed within a mold or upon a flat cooking belt as cooked within an oven. A need also exists to form an egg patty product which is more appealing in appearance for use within a breakfast sandwich susceptible to microwave heating for consumption by an individual. Further, a need exists to distinguish by observation the egg patty product from the cheese product within a food article such as a breakfast sandwich to enhance the appearance of the food article for consumption.

SUMMARY OF INVENTION

The present process relates to the formation of precooked egg patties for future heating within a microwave oven for consumption as a portion of a food article. The process involves the initial step of acquisition of liquid whole eggs, liquid egg whites and/or liquid egg yolks mixed with leavening ingredients (a mix of an acid and a base) to create an egg patty with improved texture and appearance for use within a breakfast sandwich following initial cooking. The following ingredients may be added to further improve the product including, but not limited to, non-fat dry milk, modified food starch, gums, and emulsifiers. The process in summary involves adding to liquid eggs leavening ingredients or agents, mixing, and then cooking of the mixed eggs and leavening ingredients prior to the dissipation of the leavening ingredients to form an egg patty having improved appearance and a light and airy texture resembling scrambled eggs.

A principle advantage of the present invention is to create an egg product for a breakfast sandwich having improved texture.

Another principle advantage of the present invention is to create an egg product for a breakfast sandwich having a homemade look for the egg product.

Still another principle advantage of the present invention is to create an egg product for use within a breakfast sandwich which may be formed through the use of commercially available equipment.

Still another principle advantage of the present invention is to create an egg patty with a light and airy texture resembling scrambled eggs.

Still another principle advantage of the present invention is to create an egg patty having an increased height dimension as compared to egg patties of similar weight manufactured pursuant to traditional manufacturing processes.

Still another principle advantage of the present invention is to create the appearance of more egg in a breakfast sandwich without increasing the total weight of the product.

Still another principle advantage of the invention is to create an egg patty for a breakfast sandwich having a more appetizing appearance which occurs through the use of whole eggs, egg whites, whole eggs mixed with milk, whole eggs and egg whites mixed with milk and/or any other combination of the use of whole eggs, egg whites, and/egg yolks.

Still another principle advantage of the present invention is to provide an improved egg product of relatively simple and inexpensive ingredients and processing which fulfills the intended purpose of providing a more appealing appearance for an egg patty without the fear of damage to the egg product and/egg processing equipment and/or illness to individuals.

A feature of the present invention is to combine leavening technology with egg product processing techniques to provide an enhanced egg product for a breakfast sandwich having improved texture and a homemade look.

Another feature of the present invention is the addition of acids and soda to an egg product to release gas during a desired stage of cooking and processing to provide a more desirable appearing egg patty.

Still another feature of the present invention is the addition of non-fat dry milk to an egg product to provide a more desirable appearing egg patty.

Still another feature of the present invention is the addition of modified food starch to an egg product to provide a more desirable appearing egg product.

Still another feature of the present invention is the addition of gums and/or emulsifiers (dairy blend) to provide a more desirable appearing egg patty.

Still another feature of the present invention is the use of FDA approved ingredients for formulation of a consumable egg patty.

Still another feature of the present invention is the use of standard egg processing and egg cooking equipment to form egg patties for use within breakfast sandwiches.

Still another feature of the present invention is the use of additives in a variety of ranges of ingredients to improve the appearance and appeal of an egg patty for use within a breakfast sandwich.

Still another feature of the present invention is the use of dicalcium phosphate dihydrate in the range of 0.5% to 10% to improve the appearance and appeal of an egg patty for use within a breakfast sandwich.

Still another feature of the present invention is the use of sodium bicarbonate in a range of 0.15% to 5% to improve the appearance and appeal of an egg product for use within a breakfast sandwich.

Still another feature of the present invention is the use of gums and/emulsifiers (dairy blend) in a range of 0.1% to 15% to improve the appearance and appeal of an egg product for use within a breakfast sandwich.

DETAILED DESCRIPTION

The disclosed enhanced precooked egg product and process relates to the forming of precooked egg patties which may be reheated within microwave ovens, convection ovens, griddle's or any other heating device without limitation, for consumption as a portion of a food article. This process includes a wide range of egg product formulations which when cooked, result in a visually appealing egg patty that is readily distinguishable from the other ingredients within the food article. The process for forming precooked egg patties for future heating within a microwave oven is distinctly different in certain physical-chemical characteristics as related to standard processing techniques for formulation of a product which is incorporated within items such as a breakfast sandwich.

Ordinarily one would not expect to use leavening ingredients in egg processing cooking operations to provide an improved egg patty. Cell structure in the past has not been critical for use in egg products. Cell structure is very critical in the baking industry. Therefore it is relatively common to use leavening agents within the baking industry but it has not been known to use leavening agents within the egg processing industry. Adding leavening ingredients to a formula comprised of shelled eggs would be difficult and generally impractical because of the lack of proper equipment for processing. The process for forming precooked egg patties for future heating within microwave ovens is generally only applicable to egg products formed through pumping, homogenizing, and mixing methods which are employed as the most efficient means of incorporating the leavening system into the liquid eggs.

Leavening is the ability to rise and increase in volume a food article. Leavening may occur mainly during cooking, however, leavening may be desired prior to cooking or partially before and partially during the heating of a food product. Leavening may occur through the use of water, steam, and/or gas which is utilized to expand a food product. Leavening may aerate a liquid by chemical means, yeast for production of carbon dioxide gas and/or by mechanical means such as by mixing or injection of air. Several different types of leavening agents and/or ingredients may be combined to provide a maximum amount of lift for a desired food product. For example, a combination of the use of yeast, leavening air, baking powder, and/or carbon dioxide may be utilized for leavening of a particular food product. Generally, carbon dioxide is an acceptable leavening agent in that carbon dioxide is a gas generally expands when heated. However, carbon dioxide has different functional characteristics than air, in that carbon dioxide gas is generated from within a product rather than from being incorporated into a product by beating. The creation of gas bubbles of carbon dioxide within a food product is generally sufficient to provide a desired volume of leavening action.

Carbon dioxide is generally produced through chemical means. Sodium bicarbonate generally found in baking soda or baking powder may combine with an acid to release carbon dioxide when wet and dry ingredients are mixed within a food article.

Single-acting baking powders containing tartaric acid or cream of tartar, release carbon dioxide at room temperature, and mixtures in which they are used must be baked immediately to avoid dissipation of the carbon dioxide gas. Slow-acting baking powders, containing phosphates release a portion of the carbon dioxide gas at room temperature and a portion of carbon dioxide gas when heated. Double-acting baking powder generally contains sodium aluminum sulfate and calcium acid phosphate which release a smaller amount of carbon dioxide gas when mixed and the balance of the carbon dioxide gas upon heating. Generally, suitable leavening agents for use in the formation of the enhanced egg patty disclosed herein include the use of monocalcium phosphate monohydrate ($CaH_4(PO_4)_2 \cdot H_2O$)); monocalcium phosphate anhydrous ($CaH_4(PO_4)_2$)); sodium asphate pyrophosphate ($Na_2H_2P_2O_7$); sodium aluminum phosphate ($NaH_{14}Al_3(PO_4)_8 \cdot 4H_2O$)); dicalcium phosphate dihydrate ($CaHPO_4 \cdot 2H_2O$); sodium aluminum sulfate ($Al2(SO_4)_3 \cdot Na_2SO_4$); glucono-gama-lactone ($C_8H_{10}O_6$); cream of tartar (potassium hydrogen tartrate ($KHC_4H_4O_6$); dipotassium acid phosphate ($K_2HPO_4$); monopotassium acid phosphate ($KH_2PO_4$); adipic acid ($COOH(CH_2)_4COOH$); anhydrous monocalcium phosphate ($Ca(H_2PO_4)_2$); magnesium phosphate ($MgHPO_4 MgHPO_4 \cdot 3H_2O$); and sodium trimetaphosphate ($NaPO_3)_3$).

The process of applying leavening technology to the formulation of precooked egg patties may not be used in products sold in a liquid or frozen state because the leavening gases would be released shortly after processing and therefore before use. The leavening technology, ingredients, and leavening gases would therefore be rendered non-functional within the product if available as a liquid or frozen product.

The application of the process for forming precooked egg patties for future heating within microwave ovens is generally maximized when the leavening ingredients are mixed into the liquid eggs and cooked shortly thereafter. Generally, liquid eggs do not have a doughy or bread-like texture. One would not expect to add leavening ingredients to the eggs to modify the egg structure, texture and appearance as would be typical of a baked good. In general, the leavening agents function to aerate the liquid egg product so that when the leavened liquid air product is exposed to heat carbon dioxide bubbles are formed and entrapped with the egg product to provide a light and airy texture. Leavening gas emitted from the leavening agents improves the texture and appearance of the egg patty and considerably increases the height of the egg patty for use within a breakfast sandwich.

Leavening systems in the past have been used in baking goods which contain glutens. Gluten provides a structure for gas bubbles to form providing a vehicle for the bonding of the leavening agents for expansion/elevation of the food article.

The leavening system generally functions well when used in conjunction with a liquid egg mixture. The method of adding leavening agents has been adapted for use in eggs through the introduction of a mixture of acid and bases into the eggs. Instead of mixing acid and base and dry ingredients directly into a doughy mixture, the leavening system ingredients and/or agents are generally mixed with water prior to being added to the liquid egg mixture. The mixture of water with the liquid egg product may occur within commercial processing equipment during the pumping, and mixing methods, wherein the mixed egg product is then cooked in a normal manner by introduction of the liquid egg mixture into a mold or the placement of the liquid egg mixture on a flat belt for cooking within an oven.

In general, the process for formulation of an enhanced egg patty includes: obtaining a desired amount or volume of unshelled liquid whole eggs, egg yolks, and/or egg whites by convention shelling techniques and placing the unshelled eggs in a mixing tank or vessel. In a separate tank or in the identical tank "dry ingredients" including, but not necessarily limited to, oils; gums and emulsifiers; non-fat dry milk; salt; water and leavening ingredients are placed. The "dry ingredients" are then preferably mixed. The mixed "dry ingredients" are then introduced into the liquid eggs whereupon mixing should occur. Alternatively, the "dry ingredients" may be directly mixed with the liquid eggs. The mixed liquid egg product is then pumped for preheating within a heat exchanger. The preheated mixed liquid egg product may then be pumped into a depositor. Finally, the preheated mixed liquid egg product is then preferably deposited in a mold for cooking. Cooking normally occurs by passing the molds containing the preheated liquid egg product through a convection oven. The cooked egg patties are then removed from the molds for appropriate storage and/or for inclusion within a food product such as a breakfast sandwich. The food product and/or enhanced egg patty may be cooled and/or frozen for storage and for reheating at a future time through the use of griddles, ovens, and/or microwave ovens in conjunction with a food article for consumption by an individual. It should be noted that any shape of enhanced egg patty may be provided including but not necessarily limited to shapes such as round, square, or oval. Additionally, the enhanced egg patty may be obtained in the form of a pre-cooked scrambled egg product which may be formed, folded, and/or cut into a shape as desired for consumption or for incorporation into a food article such as an omelet or breakfast sandwich.

Alternatively, the process for formulation of an enhanced egg patty may include obtaining a desired amount or volume of unshelled liquid whole eggs, egg whites, and/or egg yolks through the utilization of conventional egg shelling techniques. Placing the unshelled liquid eggs in a mixing tank for mixing with additional ingredients such as oils, gums and emulsifiers, salt, and water. In a separate tank leavening ingredients and water may be added and mixed. The mixed liquid eggs and ingredients may then be pumped to a heat exchanger for preheating. Additionally, pumping of the mixed leavening ingredients may occur for combination with the mixed liquid egg product immediately prior to the preheating phase upstream of the heat exchanger, where the mixed leavening ingredients may be introduced into the liquid eggs through the utilization of forced injection. The ratio of leavening ingredients introduced into the liquid egg products should be approximately 1 part mixed leavening ingredients per hour to 21.8 parts of mixed liquid eggs per hour as the mixed liquid eggs and mixed leavening agents pass for preheating into the heat exchangers. Next, the mixed leavening ingredients and liquid eggs are pumped to a depositor, whereupon, a desired amount of preheated mixed liquid eggs and leavening ingredients are deposited within molds. The molds containing the mixed liquid egg product and leavening ingredients are then passed into an oven for cooking. The cooked enhanced egg patties are then removed from the molds for appropriate storage and/or for inclusion within a food product such as a breakfast sandwich. The food product and/or enhanced egg patty may be cooled and/or frozen for storage, and for reheating at a future time, through the use of griddles, ovens, and/or microwave ovens in conjunction with the food article for consumption by an individual. Preferably, during the injection process the mixed leavening ingredients are introduced into the mixed liquid egg products in the same proportion as indicated herein for the non-injection formulations. Alternatively, carbon dioxide and/or dry ice may be utilized for passage within a gas line to sparge gas into the flowing mixed liquid egg products prior to the preheating phase as an alternative and/or supplemental leavening agent.

It should also be noted that homogenizing of the mixed liquid egg product may also be utilized provided that the homogenizing methods utilized do not significantly delay the continued cooking of the mixed liquid egg product. Preferably, the mixed liquid egg product is cooked within six hours of mixing and more preferably cooking occurs immediately following the mixing of the egg product to maximize the effectiveness, and minimize the dissipation, of the leavening agents during the formulation of the enhanced cooked egg patty. The homogenizing step may occur prior to the addition of the leavening agents into the liquid egg mixture in order to minimize dissipation of the leavening ingredients and/or gasses prior to cooking.

In general, the ingredients of the enhanced egg product are not required to be combined in any preferred. order for mixing. The ingredients. of the enhanced egg product are preferably mixed cold at a temperature between 32° F. to 40° F. and more preferably less than 40° F. Generally, the mixing occurs through the combination of the "dry ingredients" which are normally all the ingredients with the exception of the liquid eggs. Water, is then added to the "dry ingredients" whereupon mixing may occur. The mixed dry ingredients and water are then mixed into the liquid eggs to formulate the enhanced mixed liquid egg product. The mixing time normally is reduced to a minimum and generally is no longer than necessary to insure adequate mixing of the product. The mixing may occur through the use of a high shear mixer as is commercially available. In an alternative embodiment, additional leavening agents, and particularly sodium bicarbonate, may be introduced into previously mixed liquid egg product where cooking of the liquid egg product has been delayed in excess of six hours. The additional introduction of leavening ingredients such as sodium bicarbonate alleviates concerns over dissipation of the initial leavening gasses and rejuvenates the mixture prior to the cooking of the enhanced egg patties. A byproduct resulting from introduction of additional sodium bicarbonate is an increase in the sodium level for the final enhanced egg patty by approximately 0.11%.

Following the complete mixing of the liquid egg product a preheating step occurs prior to the formulation of the enhanced egg patties. In operation, the preheating phase is generally continuous for the enhanced mixed liquid egg product which occurs as the liquid egg mixture is pumped through equipment for introduction into a tube to tube heat exchanger. The temperature of the enhanced liquid egg product prior to the tube to tube heat exchanger is approximately 40° F. The temperature of the enhanced mixture of liquid egg product exiting the tube to tube heat exchanger and/or a scraped surface heat exchanger following completion of preheating is approximately 135° F. The preheating phase elevates the temperature of the enhanced liquid egg mixture to approximately 135° F. which occurs prior to the introduction of the liquid egg mixture into the depositor. The preheating of the mixed enhanced liquid egg product is generally accomplished prior to the introduction of the mixed liquid egg product into the depositor. The preheating of the mixed liquid egg product generally occurs through the use of a tube to tube heat exchanger which may be identified as a Feldmeier system.

In addition, the preheating procedure may continue through the use of a scraped surface heat exchanger which may be identified as the Contherm Swept Surface Heat Exchanger. It should be noted that the preheating may be eliminated and/or significantly reduced so long as cooking times and temperatures are correspondingly adjusted for cooking of the enhanced egg patties to avoid burning, sticking, and/or other undesirable complications associated with the cooking process where the starting liquid egg product has not been previously preheated.

During and/or immediately following the preheating, the mixed liquid egg product including the leavening ingredients, are preferably pumped and/or passed through the depositor for the delivery of a specific weight of mixed liquid egg material into a mold at a set rate. The speed or rate of the depositor may be regulated for the formulation of the enhanced egg patties. The speed of the depositor is the rate at which a mold is filled with mixed liquid egg product for movement through an oven. Generally, the depositor operates at a rate of between 10 and 20 shots per minute which represents the number of molds being filled each minute for cooking. Generally, each mold is of sufficient size to hold between 55 and 65 grams of liquid egg product for formulation into enhanced egg patties. It should be noted that larger molds may be utilized which are adapted for receipt and holding of 90 grams of liquid egg product for cooking within an oven. During the use of larger capacity molds, the depositor is normally operated at a rate to fill 10 molds per minute. The mixed fluid egg mixture is preferably preheated immediately prior to the introduction into a depositor which places the liquid egg product into a mold. The mold in turn is then immediately moved into an oven for cooking.

In general, a continuous forced draft convection heating oven is utilized for cooking of the mixed enhanced liquid egg product for formulation of the improved egg patties. A suitable forced draft convection heating oven is preferably identified as a Wolverine Proctor convection oven. The operational oven temperature parameters are usually identified as 350° F. to 475° F. where the dampers and related humidity within the convection oven may be adjusted dependent upon the local environmental conditions as identified within the examples indicated herein.

A typical formula for the liquid egg product used to provide an enhanced egg patty, would involve the use of liquid whole eggs constituting 62.74%; water being 24.98%; corn oil being 6%; non-fat dry milk being 2.75%; dairy blend being 1.25% (gums and emulsifiers); dicalcium phosphate dihydrate being 1%; salt being 0.65%; sodium bicarbonate being 0.33%; xanthan gum being 0.15% and butter flavor being 0.15%, where the percentages indicated relate to the relative percentages by weight of the mixed liquid egg product prior to cooking.

An alternative mixture of liquid egg product used to provide an enhanced egg patty, would involve the use of liquid egg whites constituting 97.38%; purity W starch as available from National Starch and Chemical Co., 10 Findene Avenue, Bridgewater, N.J. 08807, being 1.5%; dicalcium phosphate dihydrate being 0.75%; sodium bicarbonate being 0.25%; xanthan gum being 0.1% and citric acid being between 0.02% and 0.05%, where the percentages indicated relate to the relative percentages by weight of the mixed liquid egg product prior to cooking.

Another alternative formula for the liquid egg product to be used in the process of formation of enhanced precooked egg patties would include liquid whole eggs constituting 95.69%; dairy blend (gums and emulsifiers) constituting 1.5%; dicalcium phosphate dihydrate being 2%; sodium bicarbonate 0.66% and xanthan gum being 0.15%, where the percentages indicated relate to the relative percentages by weight of the mixed liquid egg prior to cooking.

Another alternative formula for the liquid egg product to be used in processing for formulation of enhanced precooked egg patties would include whole eggs constituting 50%; egg whites constituting 45.44%; purity W (modified food starch) starch as available from National Starch and Chemical Co., Bridgewater, N.J. 08807, being 1.5%; dairy blend (gums and emulsifiers) being 1.25%; dicalcium phosphate dihydrate being 1.25%; sodium bicarbonate being 0.41%; and xanthan gum being 0.15%, where the percentages indicated relate to the relative percentages by weight of the mixed liquid eggs prior to cooking.

The ingredients for the liquid egg product and leavening agents may be mixed for approximately 5 to 10 minutes and then the mixed liquid egg product may be pumped through commercial processing equipment for cooking in a commercial convection oven. Alternatively, the ingredients may be mixed through constant stirring for a desired period of time, whereupon the mixed liquid egg product may be pumped into the depositor for further processing. Alternatively the mixed liquid egg product may be exposed to homogenizing through commercial homogenizing equipment.

The mixed formulated liquid egg product may be cooked without a preheating stage to avoid reaction of the sodium bicarbonate and the release of carbon dioxide gas in the liquid stage prior to cooking. It should be noted that preheating of the liquid egg mixture to a temperature of 135° F. may occur so long as the preheating does not permit significant dissipation of carbon dioxide gas from the sodium bicarbonate reaction process during the liquid stage of the egg product. It is desirable for the reaction of sodium bicarbonate and the release of carbon dioxide gas to occur in the cooking stage and not in the liquid stage of the mixed liquid egg product. It is also generally desirable to avoid over mixing of the formulated liquid egg product. Excess mixing or agitation may result from the use of powerful mixing equipment causing the release of carbon dioxide gas reducing the effectiveness of the leavening ingredients. Excess agitation may cause the degradation of the leavening ingredients and the premature release of carbon dioxide gas in the liquid phase prior to cooking.

Cooking times may vary considerably based upon the temperature selected within the commercial oven.

EXAMPLES

Example I

The above-identified process was utilized to formulate and enhanced egg patty. The ingredients for the egg patty were separated into two components. The first component was formed of egg whites being 97.05% of the weight of the entire first component; purity W starch as available from National Starch and Chemical Co., 10 Findene Avenue, Bridgewater, N.J., being 1.5% of the entire weight of the first component; dicalcium phosphate being 1% of the entire weight of the first component; sodium bicarbonate being 0.33% of the entire weight of the first component; xanthan gum being 0.1% of the entire weight of the first component; and citric acid being 0.02% of the entire weight of the first component.

The second component was formed of egg yolk being 49.75% of the entire weight of the second component; yolk balls being 39.85% of the entire weight of the second component; water being 10% of the entire weight of the second component; locust bean gum being 0.25% of the entire weight of the second component and xanthan gum being 0.15% of the entire weight of the second component.

Each of the first components and second components were thoroughly mixed for separate pumping to a depositor as earlier described.

The first component was not preheated and initially 56 grams were filled within a mold size having approximate diameter dimension of 3½ inches. Next the second component was preheated to 120° F. and 14 grams of the second component were added on top of the first component within the 3½ inch diameter mold. The depositor was operating at a rate of 17 shots per minute which corresponded to the cooking time of the molds within the convection oven. The convection oven operational parameters were set at 475° F. for temperature having the top damper at a 0.2 position and the bottom damper being open.

The above-identified ingredients and processing procedures resulted in an enhanced egg patty having increased thickness, and improved color, texture, mouth feel, and overall appearance as compared to egg patties not formulated according to the above-identified specification.

Example II

A round scrambled egg patty was obtained according to the procedures identified above. The round scramble egg patty ingredients initially were whole eggs in an amount of 62.74% of the entire weight of the product; water being 24.98% of the entire weight of the product; corn oil being 6% of the entire weight of the product; non-fat dry milk being 2.75% of the entire weight of the product; In-Flate Starch as available from National Starch and Chemical Co., 10 Findene Avenue, Bridgewater N.J., being 1.25% of the entire weight of the product; dicalcium phosphate being 1% of the entire weight of the product; salt being 0.65% of the entire weight of the product; sodium bicarbonate being 0.33% of the entire weight of the product; xanthan gum being 0.15% of the entire weight of the product; and butter flavor being 0.15% of the entire weight of the product. The ingredients were mixed for pumping to the depositor as earlier described. The mixed egg product was preheated to 135° F. prior to introduction into the depositor. The preheating was accomplished first through a tube to tube heat exchanger and then through a scraped surface heat exchanger. The initial operating temperatures for the oven were set at 435° F. where the depositor was operating at 17 shots per minute for filling of a 3½ inch diameter mold with 61 grams of liquid mixed egg material. The top oven damper was set at 0.3 and the bottom oven damper was open for the convection oven. The above-identified ingredients and processing procedures provided an enhanced egg patty having increased thickness and improved color, texture, mouth feel, and overall appearance as compared to egg patties not formulated according to the above-identified specifications.

Example III

A squared scrambled egg patty was obtained through the utilization whole eggs being 62.57% of the entire weight of the product; water being 26.28% of the entire weight of the product; corn oil being 5% of the entire weight of the product; non-fat dry milk being 2.75% of the entire weight of the product; In-Flate Starch as available from National Starch and Chemical Co., 10 Findene Avenue, Bridgewater N.J., being 1.25% of the entire weight of the product; dicalcium phosphate being 1% of the entire weight of the product; salt being 0.5% of the entire weight of the product; sodium bicarbonate being 0.33% of the entire weight of the product; xanthan gum being 0.15% of the entire weight of the product; butter flavor being 0.1% of the entire weight of the product; citric acid being 0.05% of the entire weight of the product; and pepper being 0.02% of the entire weight of the product. The ingredients for the enhanced egg patty were thoroughly mixed for pumping to the tube to tube heat exchanger and the scraped surface heat exchanger which elevated the temperature of the mixed enhanced liquid egg product to 135° F. the mixed enhanced liquid egg product was then transferred to a depositor which was operating at 13 shots per minute for filling of a mold having size dimensions of 8¾ inches by 3 inches and where each mold contained 61 grams of mixed liquid egg product. The convection oven operating temperatures were set at 350° F. where the top damper was closed and the bottom damper was open.

The above-identified ingredients and processing procedures resulted in an enhanced egg patty having increased thickness, and improved color, texture, mouth feel, and overall appearance as compared to egg patties not formulated according to the above-identified specifications.

Example IV

An enlarged round scrambled egg patty was obtained by utilization of the ingredients identified in Example II. These ingredients were pumped to a tube to tube heat exchanger and/or scraped surface heat exchanger for preheating to a temperature of 135° F. The mixed liquid egg material was then transferred to a depositor which filled a mold having approximate size dimension of 4 inches in diameter at a rate of 10 shots per minute. Each mold was filled with 90 grams of mixed liquid egg product. The convection oven temperature setting was 435° F. where the top damper was set at the 0.1 position and the bottom damper was open.

The above-identified ingredients and processing procedures resulted in an enhanced egg patty having increased thickness, and improved color, texture, mouth feel and overall appearance as compared to egg patties not formulated according to the above-identified specifications.

Example V

An alternative squared scrambled egg patty was obtained by utilization of the ingredients identical to Example III above. The mixed ingredients were transferred by pump to a tube to tube heat exchanger and/or scraped surface heat exchanger for preheating where the temperature of the mixed enhanced liquid egg product was elevated to 135° F. The liquid egg product was then pumped to the depositor which was operating at a rate of 13 shots per minute for filling a mold size having approximate dimensions of 6 inches by 3 inches with 61 grams of liquid egg product. The molds were then cooked within a convection oven having an operating temperature of 350° F. having a closed top damper and an open bottom damper. The above-identified ingredients and processing procedures resulted in an enhanced egg patty having increased thickness, and improved color, texture, mouth feel and overall appearance as compared to egg patties not formulated according to the above-identified specifications.

Example VI

An enhanced egg patty was formulated through the use of 2,472.8 pounds of whole egg (61.82%); 82 pounds of citric acid (2.05% total); 1,051.2 pounds of water (26.28%); 200 pounds of soy oil (5%); 110 pounds of Pro Mix 632 (2.75%) (combination of non-fat dry milk and whey) as available from All American Foods, Inc., of Mankato, Minn.; 40 pounds of dicalcium phosphate dihydrate; 20 pounds of salt (0.5%); 13.2 pounds of sodium bicarbonate (0.33%); 6 pounds of xanthan gum (0.15%); 4 pounds of butter flavor (0.1%); and 0.8 pounds of liquid pepper (0.02%).

Initially, 2,472.8 pounds of whole egg and 80 pounds of citric acid were placed in a mixing vessel where mixing was initiated. Next, the 200 pounds of soy oil was added to the vessel where mixing continued. Next, 1,051.2 pounds of water was added to the mixing vessel where mixing continued. An additional 2 pounds of citric acid was then added to the mixing vessel for continued mixing. Next, 4 pounds of butter flavor was added to the mixing vessel whereupon mixing continued. Next, 0.8 pounds of liquid pepper was added to the mixing vessel for continued mixing. Next, 20 pounds of salt was added to the mixing vessel and then 110 pounds of Pro mix 632 (combination of non-fat dry milk and whey) as available from American Foods, Inc., of Mankato, Minn., was added to the mixing vessel where mixing continued. Next, 40 pounds of dicalcium phosphate dihydrate was added to the mixing vessel followed by the addition of 13.2 pounds of sodium bicarbonate. Lastly, 6 pounds of xanthan gum was added to the mixing vessel where mixing continued until all the ingredients were mixed.

The cooking of the mixed ingredients of Example VI provided an enhanced egg patty. The cooking parameters initially were for a temperature setting within the convection oven of 400° F. The mixed liquid egg product was preheated within the tube to tube heat exchanger to 130° F. The liquid egg mixture was then passed through the scraped surface heat exchanger where the temperature was elevated to 145° F. The belt speed through the convection oven was set at a cooking speed of 120 seconds. The cooking weight of liquid egg product within each mold was established at 51 grams. The steam pressure within the convection oven was 2700 pph and the internal dew point for the convection oven was 176° F. The top front damper was set at 0.1, the top back damper was set at 0.1, the bottom front damper was set at 0.065, and the bottom back damper was set at 0.01. The internal product temperature for the egg patties was not permitted to drop below the 178° F. minimum. The above-identified ingredients and processing procedures resulted in an enhanced egg patty having increased thickness, and improved color, texture, mouth feel and overall appearance as compared to egg patties not formulated according to the above-identified specifications.

Example VII

An enhanced egg patty was obtained through the initial placement of 2,476.8 pounds of whole egg (61.92%) within a mixing vessel. Next, 80 pounds of citric acid (2.0%) was added to the vessel whereupon mixing was commenced. Next, 240 pounds of soy oil (6.0%) was added to the mixing vessel for continued mixing. Next, 999.2 pounds of water (24.98%) was added to the mixing vessel followed by the addition of 28 pounds of salt (0.5%) whereupon mixing continued. Next, 6 pounds of natural egg WONF (0.15%) was added to the mixing vessel along with 0.8 pounds of natural butter WONF (0.02%) whereupon mixing continued. Next, 110 pounds of Pro Mix 632 (2.75%) (combination of non-fat dairy milk and whey) as available from All American Foods, Inc., of Mankato, Minn., was added for continued mixing. Next, 40 pounds of dicalcium phosphate dihydrate (1.0%) was added to the mixing vessel followed by the addition of 13.2 pounds of sodium bicarbonate (0.33%). Finally, 6 pounds of xanthan gum (0.15%) was added to the mixing vessel whereupon mixing continued until all the ingredients were mixed. The liquid egg product was then cooked according to the above-identified procedures where the liquid egg mixture was initially preheated within a tube to tube heat exchanger to 130° F. Next the liquid egg mixture was heated within the scraped surface heat exchanger to 145° F. whereupon the liquid egg mixture was placed within a depositor. The belt speed for cooking of the individual molds of egg patties was set at 120 seconds for cooking of 51 grams of liquid mixed egg product within each mold. The convection oven temperature was set at 400° F. where the steam pressure within the oven was 2700 pph and the dew point was 176° F. The damper settings for the oven were set at top front 0.1, top back 0.1, bottom front 0.065, and bottom back 0.01. The initial product temperature was maintained at a minimum of 178° F. The above-identified ingredients and processing procedures resulted in an enhanced egg patty having increased thickness, and improved color, texture, mouth feel and overall appearance as compared to egg patties not formulated according to the above-identified specifications.

Example VIII

An enhanced egg patty was formed by the initial placement of 2,476.8 pounds of whole egg (61.92%) and 80 pounds of citric acid (2.0%) within a mixing vessel where mixing was commenced. Next, 240 pounds of soy oil (6.0%) was added to the mixing vessel where mixing continued. Next, 840.8 pounds of water (24.96% total) was added to the mixing vessel along with 28 pounds of salt (0.7%) where mixing continued. Next, 6 pounds of natural egg WONF (0.15%) was added along with 0.8 pounds of natural butter WONF (0.02%). Next, 110 pounds of Pro Mix 632 (2.75%) (combination of non-fat dairy milk and whey) as available from All American Foods, Inc., of Mankato, Minn., was then added for mixing within the mixing vessel. Next, 40 pounds of dicalcium phosphate dihydrate (1.0%) was placed in the mixing vessel along with 6 pounds of xanthan gum (0.15%). Mixing was continued until all ingredients were mixed. In a separate mixing vessel, 13.2 pounds of sodium bicarbonate (0.33%) and 158.4 pounds of water were mixed until the sodium bicarbonate had completely dissolved.

The sodium/water solution was added to the liquid egg mixture using a "T" pipe injection connection directly before the product pump and upstream of the depositor. The sodium/water solution was added to the liquid egg mix at a rate of 87 pounds hour as compared to the rate of liquid flow for the egg mix solution of 1900 pounds per hour.

The resulting liquid egg and liquid sodium mix was then preheated to a temperature of 130° F. within the tube to tube heat exchanger and then to a temperature of 145° F. within the scraped surface heat exchanger. The depositor then filled suitable molds with 51 grams of liquid egg product for cooking. The oven temperature was initially set at 400° F. where the belt speed was set at 120 seconds for cooking time. The steam pressure within the oven was 2700 pph and the dew point was established at 35%. The top front damper for the oven was shut, the top back damper was shut, the bottom front damper was set at 0.4, and the bottom back damper was shut. The initial product temperature was maintained at least at a 182.2° F.

The above-identified ingredients and processing procedures resulted in an enhanced egg patty having increased thickness, and improved color, texture, mouth feel and overall appearance as compared to egg patties not formulated according to the above-identified specifications.

Example IX

An enhanced egg patty was obtained through the initial placement of 644.36 pounds of liquid egg (54.55%) and 23.62 pounds of citric acid (0.02%) within a mixing vessel. The ingredients of 213.54 pounds of water (33.7% total); 28.78 pounds of Pro Mix 632 (2.44%) (non-fat dry milk and whey) as available from All American Foods, Inc., of Mankato, Minn.; 52.33 pounds of soy oil (4.43%); 10.47 pounds of dicalcium phosphate dihydrate (0.89%); 5.23 pounds of salt (0.44%); 1.57 pounds of xanthan gum (0.13%); 1.05 pounds of butter flavor (0.09%); and 0.21 pounds of liquid pepper (0.02%) were added to the mixing vessel whereupon mixing was commenced until all the ingredients were thoroughly mixed. To a separate vessel were added 15.44 pounds of sodium bicarbonate (1.31%) and 184.56 pounds of water. Mixing within the separate mixing vessel was commenced until all of the sodium bicarbonate was dissolved. The sodium/water solution was added to the liquid egg mixture using an "T" pipe injection connection directly before the product pump and upstream of the depositor. The sodium/water solution was added to the liquid egg mixture at a rate of 130.8 pounds per hour as compared to the rate of liquid flow for the egg mixture product of 3000 pounds per hour. The resulting liquid egg and liquid sodium mixture was then preheated to a temperature of 125.4° F. within the tube to tube heat exchanger and to a temperature of 138.9° F. within the scraped surface heat exchanger. The depositor filled suitable molds with 51 grams of liquid egg product for cooking. The oven temperature was initially set at 400° F. where the belt speed was set at 2.74 minutes for cooking time. The steam pressure within the oven was set at 18 psi. The settings for the oven included a top front damper at 0.1, a top middle damper at 0.05, a top back damper at 0.05, a bottom front damper at 0.25, a bottom middle damper at 0.1, and a bottom back damper 0.5.

The above-identified ingredients and processing procedures resulted in an enhanced egg patty having increased thickness, and improved color, texture, mouth feel and overall appearance as compared to egg patties not formulated according to the above-identified specifications.

Example X

An enhanced egg patty was obtained through the use of 1,595.5 pounds of liquid whole egg; 657 pounds of water; 68.75 pounds of Pro Mix 632 (non-fat dry milk and whey) as available from All American Foods, Inc., of Mankato, Minn.; 125 pounds of soy oil; 25 pounds of dicalcium phosphate dihydrate; 12.5 pounds of salt; 8.2 pounds of sodium bicarbonate; 3.75 pounds of xanthan gum; 2.5 pounds of butter flavor; 1.25 pounds of citric acid; and 0.5 pounds of liquid pepper. The percentage composition of the product is identified as liquid egg being 63.82%; water being 26.28%; Pro Mix 632 being 2.75%; soy oil being 5%; dicalcium phosphate dihydrate being 1%; salt being 0.5%; sodium bicarbonate being 0.33%; xanthan gum being 0.15%; butter flavor being 0.1%; citric acid being 0.05%; and liquid pepper being 0.02% where the percentages identified are percentages of the total weight of the product.

Initially, the entire liquid whole egg was added to a mixing vessel where the mixer was initiated agitating the bottom at 5% and the top of the mixer at 50%. Next all of the soy oil was added to the mixing vessel where mixing continued. Next 627 pounds of water was added to the mixing vessel where 30 pounds of water were saved to rinse the tank walls after the addition of the dry ingredients. Next, the bottom agitator of the mixing vessel was increased to 50% and the top agitator of the mixing vessel was increased to 100%. Next, the citric acid was added to the mixing vessel followed by the addition of the butter flavor and the liquid pepper. Next the salt was added to the mixing vessel whereupon the agitator was increased to 100% at the bottom and 100% at the top. Next, the Pro Mix 632, as available from All American Foods of Mankato, Minn., non-fat dry milk and whey was added to the mixing vessel followed by the addition of the dicalcium dihydrate. Next, the sodium bicarbonate was added to the mixing vessel followed by the addition of the xanthan gum. The tank walls were then rinsed with the 30 gallons of water withheld as identified above, whereupon mixing continued until all the ingredients were mixed. The resulting liquid egg mixture was preheated to a temperature of 126.7° F. within the tube to tube heat exchanger and to a temperature of 135° F. within the scraped surface heat exchanger. The oven temperature was initially set at 392° F. where the belt speed was set at 150 seconds for cooking time. The dew point within the oven was set at 173° F. The top front damper was set at 0.09, the bottom front damper was set at 0.1, and the bottom back damper was set at 0.025.

The above-identified ingredients and processing procedures resulted in an enhanced egg patty having increased thickness, and improved color, texture, mouth feel and overall appearance as compared to egg patties not formulated according to the above-identified specifications.

Example XI

The ingredients and mixing procedures as identified for Example X were duplicated in Example XI. The resulting liquid egg mixture was then preheated to a temperature of 126.6° F. within the tube to tube heat exchanger and to a temperature of 135.3 within the scraped surface heat exchanger. The oven temperature was initially set at 406° F. where the belt speed was also set at 150 seconds cooking time. The steam pressure within the oven was set at 100% and the dew point as established at 173° F. The top front damper was set at 0.09, the bottom front damper was set at 0.1, and the bottom back damper was set at 0.025.

The above-identified ingredients and processing procedures resulted in an enhanced egg patty having increased thickness, and improved color, texture, mouth feel and overall appearance as compared to egg patties not formulated according to the above-identified specifications.

Example XII

The ingredients and mixing parameters as identified for Example X were duplicated within Example XII. The resulting egg mixture was then preheated to a temperature of 126.7° F. within the tube to tube heat exchanger and to a temperature of 135° within the scraped surface heat exchanger. The oven temperature was initially set at 421° F. where the belt speed was also set at 150 seconds for cooking time. The steam pressure within the oven was set at 100% and the dew point as established at 170° F. The top front damper was set at 0.1, the top back damper was set at 0.11, the bottom front damper was set at 0.04, and teh bottom back damper was set at 0.015.

The above-identified ingredients and processing procedures resulted in an enhanced egg patty having increased thickness, and improved color, texture, mouth feel and overall appearance as compared to egg patties not formulated according to the above-identified specifications.

Example XIII

The ingredients and mixing parameters as identified for Example X were duplicated within Example XII. The resulting liquid egg mixture was then preheated to a temperature of 126.8° F. within the tube to tube heat exchanger and to a temperature of 141° within the scraped surface heat exchanger. The oven temperature was initially set at 442° F. where the belt speed was also set at 150 seconds for cooking time. The steam pressure within the oven was set at 100% and the dew point as established at 173° F. The top front damper was set at 0.2; the top back damper was set at 0.3, the bottom front damper was set at 1, and the bottom back damper was set at 0.5.

The above-identified ingredients and processing procedures resulted in an enhanced egg patty having increased thickness, and improved color, texture, mouth feel and overall appearance as compared to egg patties not formulated according to the above-identified specifications.

It should be noted that the process steps identified above may be substantially interchanged and modified without sacrifice as to the final enhanced egg patty product.

In general, the ingredients identified herein have been provided for illustrative purposes and should not be considered as restrictive. For example, the leavening acid may be any of the compounds identified in association with dicalcium phosphate dihydrate, namely monocalcium phosphate monohydrate, monocalcium phosphate anhydrous, sodium asphate pyrophosphate, sodium aluminum phosphate, sodium aluminum sulfate, glucono-gamma-lactone, cream or tartar, dipotassium acid phosphate, monopotassium acid phosphate, adipic acid, anhydrous monocalcium phosphate, magnesium phosphate, and sodium trimetaphosphate.

In addition, reference herein to modified food starch may generally include a wide variety of commercially available corn starches and/or potato starches used in food products which are FDA approved for consumption by individuals. In addition, certain sugars may be used as substitutes for, or in combination with, either of the modified food starches identified herein. Further, reference herein to soy oil and/or corn oil may include reference to other edible oils namely peanut oil, and vegetable oils. It should be noted that a number of alternative edible oils may adequately function as substitute ingredients for the identified soy bean oil and/or corn oil herein. Carboxymethyl cellulose, carrageenan, guar gums, locust bean gum, beta carotene, agar, glycerol monostearate, monodiglycerides and propylene glycol esters may function as acceptable substitutes and/or replacements for the xanthan gum and the gums and emulsifiers identified herein. Further, other milk products may be substituted for the non-fat dry milk and whey as indicated herein for incorporation into the enhanced egg patty.

Generally, emulsifiers coat air cells to provide stabilization and to increase the volume of amount of gas within a food article. Carbon dioxide gas usually does not spontaneously form bubbles in most food products. The addition of emulsifiers assist to create more uniform gas cells which function as nucleation locations for carbon dioxide gas. The gums and emulsifiers identified above namely carboxymethyl cellulose, carrageenan, guar gums, locust bean gum, beta carotene, agar, glycerol monostearate, monodiglycerides, propylene glycol esters and xanthan gum preferably assist in the chemical leavening of the egg products by establishing more uniform gas cells within the liquid egg.

It should be noted that the percentage weights provided herein have been rounded mathematically which in certain instances may not exactly equal 100%. In these instances, the percentage of eggs/or water may be insignificantly increased or decreased to provide a 100% summation.

In general, the percentage of eggs in the enhanced egg product is between 54% to 64% by weight of the entire egg product. Water is normally provided in the range of to 35% of the weight of the entire egg product. Starch generally forms between 0.5% to 3% of the weight of the entire egg product. Edible oils also generally form between 4% and 7% of the entire weight of the enhanced egg product. The leavening acids generally form between 0.5% and 10% of the entire weight of the enhanced egg product while the leavening base is generally formed between 0.1% and 5% of the weight of the entire egg product. Salt normally forms between 0.4% and 0.8% of the weight of the entire egg product. The gums and emulsifiers generally form between 0.1% and 5% of the weight of the entire egg product. Butter flavor generally constitutes between 0.1% and 0.175% of the weight of the entire egg product. Also, citric acid generally forms between 0.01% and 3% of the weight of the entire egg product. Liquid pepper may also be included within the egg product where the liquid pepper is formed in an amount approximately 0.02% of the weight of the entire egg product. Non-fat dry milk is also provided between 1% and 4% of the weight of the entire egg product.

The above Examples and disclosure are intended to be illustrative and not exhaustive. These examples and description will suggest many variations and alternatives to one of ordinary skill in this art. All these alternatives and variations are intended to be included within the scope of the attached claims. Those familiar with the art may recognize other equivalents to the specific embodiments described herein which equivalents are also intended to be encompassed by the claims attached hereto.

The present invention may be embodied in other specific forms without departing from the spirit or essential attributes thereof; therefore, the illustrated embodiment should be considered in all respects as illustrative and not restrictive, reference being made to the appended claims rather than to the foregoing description to indicate the scope of the invention.

What is claimed is:

1. A method for formation of an egg patty comprising:
   a) placing unshelled eggs, water, an emulsifier, and an edible oil in a mixing vessel;
   b) mixing the contents of the mixing vessel to form a mixed liquid egg product;
   c) adding to the mixed liquid egg product leavening agents comprising a leavening acid and a leavening base;
   d) transporting the mixed liquid egg product and leavening agents to an oven;
   e) cooking the mixed liquid egg product and leavening agents by the exposure to heat wherein said heat activates said leavening agents for entrapment of gas into pockets within said egg product; and
   f) formation of an egg patty.

2. The method according to claim 1, wherein said adding of leavening agents occurs by injection.

3. The method according to claim 1, further comprising mixing the leavening acid and the leavening base in water prior to the adding of the leavening agents to the mixed liquid egg product.

4. The method according to claim 1, further comprising depositing the mixed liquid egg product and the leavening agents into a mold prior to cooking.

5. The method according to claim 1, wherein the cooking occurs by placement of the mixed liquid egg product and leavening agents on a flat belt.

6. The method according to claim 1, further comprising preheating said mixed liquid egg product.

7. The method according to claim 1, further comprising homogenizing said mixed liquid egg product.

8. The method according to claim 1, wherein said mixed liquid egg product is cooked within six hours of mixing.

9. The method according to claim 1, wherein the mixing of the liquid egg product occurs cold at a temperature below 41° F.

10. A method for formation of an egg patty comprising:
a) placing unshelled liquid eggs into a first mixing vessel;
b) placing water, an emulsifier, and an edible oil into a second mixing vessel;
c) mixing the contents of the second mixing vessel into the first mixing vessel to form a mixed liquid egg product;
d) adding to the mixed liquid egg product leavening agents comprising a leavening acid and a leavening base;
e) transporting the mixed liquid egg product and leavening agents to an oven;
f) cooking the mixed liquid egg product and leavening agents by the exposure to heat wherein said heat activates said leavening agents for entrapment into gas into pockets within said egg product; and
g) formation of an egg patty.

11. The method according to claim 10 further comprising preheating said mixed liquid egg product.

12. The method according to claim 10 further comprising homogenizing said mixed liquid egg product.

13. The method according to claim 10 further comprising depositing the mixed liquid egg product and leavening agents into a mold prior to cooking.

14. The method according to claim 10 wherein the cooking occurs by placement of the mixed liquid egg product and leavening agents on a flat belt.

15. The method according to claim 10, further comprising the addition of non-fat dry milk, an edible gum, and salt into the second mixing vessel prior to mixing of the liquid egg product.

16. The method according to claim 10, herein said mixed liquid egg product is cooked within six hours of mixing.

17. The method according to claim 10, herein the mixing of the liquid egg product occurs cold at a temperature below 41° F.

* * * * *